(12) United States Patent
Li et al.

(10) Patent No.: US 10,972,976 B2
(45) Date of Patent: Apr. 6, 2021

(54) STATION WAKE-UP METHOD, RELATED DEVICE, AND SYSTEM

(71) Applicant: HUAWEI TECHNOLOGIES CO., LTD., Shenzhen (CN)

(72) Inventors: Xiaoxian Li, Shenzhen (CN); Ping Fang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/313,466

(22) PCT Filed: Jun. 30, 2016

(86) PCT No.: PCT/CN2016/088017
§ 371 (c)(1),
(2) Date: Dec. 27, 2018

(87) PCT Pub. No.: WO2018/000383
PCT Pub. Date: Jan. 4, 2018

(65) Prior Publication Data
US 2019/0320388 A1 Oct. 17, 2019

(51) Int. Cl.
*H04W 52/02* (2009.01)
*H04W 84/12* (2009.01)

(52) U.S. Cl.
CPC ........ *H04W 52/0229* (2013.01); *H04W 84/12* (2013.01)

(58) Field of Classification Search
CPC ............. H04W 52/0235; H04W 72/12; H04W 52/0212; H04W 52/0229; H04W 52/028; H04W 84/12; H04W 88/008
See application file for complete search history.

(56) References Cited

U.S. PATENT DOCUMENTS

| 9,872,252 | B1* | 1/2018 | Ang | ...................... H04W 76/28 |
| 2008/0031173 | A1* | 2/2008 | Zhang | ............... H04W 52/0229 370/311 |

(Continued)

FOREIGN PATENT DOCUMENTS

| CN | 101610566 A | 12/2009 |
| CN | 101617506 A | 12/2009 |

(Continued)

OTHER PUBLICATIONS

IEEE802.11-16/0341r0,LP-WUR (Low-Power Wake-Up Receiver) Follow-Up, Mar. 14, 2016, 9 pages.

(Continued)

*Primary Examiner* — Mewale A Ambaye
(74) *Attorney, Agent, or Firm* — Kilpatrick Townsend & Stockton LLP

(57) ABSTRACT

A station wake-up method including: sending, by a radio access point, a work time extension indication message to wake-up modules of n stations in associated stations, where a station includes a wake-up module and a communications module, the wake-up modules of the n stations are in an awake state, n is an integer greater than or equal to 1, and the work time extension indication message is used for instructing the wake-up modules of the n stations to add a new awake window after a current awake window; and sending, by the radio access point, a wake-up message to a wake-up module of at least one of the n stations, where the wake-up message is used for instructing the station to wake up a corresponding communications module, and the wake-up message is sent in a current awake window or a new awake window of the at least one station.

17 Claims, 8 Drawing Sheets

S301 — A station receives, in a current awake window, a work extension indication message sent by a radio access point S302 — The station adds a new awake window after the current awake window based on the work extension indication message S303 — The station wakes up a communications module when receiving, in the current awake window or the new awake window, a wake-up frame sent by the radio access point

(56) References Cited

U.S. PATENT DOCUMENTS

| | | | |
|---|---|---|---|
| 2008/0186893 A1* | 8/2008 | Kolding | H04W 52/0235 370/311 |
| 2010/0189021 A1 | 7/2010 | He et al. | |
| 2012/0057476 A1* | 3/2012 | Chan | H04W 88/06 370/252 |
| 2015/0078230 A1* | 3/2015 | Choi | H04W 52/0216 370/311 |
| 2015/0208349 A1* | 7/2015 | Ramamurthy | H04W 52/0212 370/311 |
| 2015/0334648 A1* | 11/2015 | Ansari | H04W 52/0206 370/311 |
| 2016/0174154 A1 | 6/2016 | Wentink et al. | |
| 2018/0014165 A1* | 1/2018 | Li | H04W 74/06 |
| 2018/0152892 A1 | 5/2018 | Kolding et al. | |
| 2018/0234918 A1* | 8/2018 | Asterjadhi | H04W 52/0229 |
| 2018/0302854 A1 | 10/2018 | Ramamurthy et al. | |
| 2020/0374964 A1* | 11/2020 | Wang | H04W 88/06 |

FOREIGN PATENT DOCUMENTS

| | | |
|---|---|---|
| CN | 101637052 A | 1/2010 |
| CN | 102740427 A | 10/2012 |
| CN | 103327651 A | 9/2013 |
| CN | 104205993 A | 12/2014 |
| CN | 104363656 A | 2/2015 |
| CN | 104581908 A | 4/2015 |
| CN | 104618996 A | 5/2015 |
| CN | 104795971 A | 7/2015 |
| CN | 103782634 B | 11/2017 |

OTHER PUBLICATIONS

IEEE802.11-16/0722r1, Proposal for Wake-Up Receiver (WUR) Study Group, May 18, 2016, 14 pages.

IEEE802.11-15/1307r0, Low-Power Wake-Up Receiver (LP-WUR) for 802.11, Nov. 10, 2015, 18 pages.

\* cited by examiner

STATION WAKE-UP METHOD, RELATED DEVICE, AND SYSTEM

CROSS-REFERENCE TO RELATED APPLICATIONS

This application is a national stage of International Application No. PCT/CN2016/088017, filed on Jun. 30, 2016, which is hereby incorporated by reference in its entirety.

TECHNICAL FIELD

Embodiments of the present invention relate to the communications field, and in particular, to a station wake-up method, a related device, and a system.

BACKGROUND

A quantity of terminals supporting Wi-Fi is increasing as scale development of WLAN (Wireless Local Area Networks, wireless local area network, WLAN for short) networks. Due to mobility of the WLAN networks, a network designer and a terminal vendor have to consider a live time problem of a mobile terminal. To ensure that a wireless terminal can use a WLAN network for a long time, protocol designers have proposed a terminal power saving mode (also referred to as a sleep mode). In a wireless radio frequency system, to maintain a longest battery use time, an 802.11 terminal may turn off a radio wave transceiver, and enter a sleep state. A terminal that has entered the sleep state does not receive or send any data. If data is sent to this terminal, a radio access point caches the data of the terminal, and sends these data to the terminal after the terminal wakes up. This is a power saving mode of a wireless terminal. Corresponding to the power saving mode is an active mode of the terminal. In this case, a radio transceiver of the terminal normally works, and the radio access point directly sends data to the terminal.

In the existing IEEE 802.11 protocol, before a terminal goes to sleep, a listen interval listen interval is set for the terminal, and after the listen interval, the terminal needs to wake up to detect whether there is data sent to the terminal. The radio access point needs to cache a data frame sent to a sleeping terminal, and therefore cache duration is greater than or equal to the listen interval. If the terminal does not wake up, after the cache duration, to obtain the cached data, the radio access point directly discards these frames without notification. The listen interval is set by a driver of the terminal, and different terminals have different intervals.

If the radio access point caches a data frame of the sleeping terminal, the radio access point tells the terminal by using information indicating that data is to be transmitted (Traffic Indication Map, TIM for short), and the indication information is transmitted by using a beacon frame. The wireless terminal needs to periodically wake up to listen to the beacon frame, and determine, by checking a TIM field of the beacon frame, whether the radio access point has a data frame needing to be sent to the wireless terminal. If the wireless terminal determines that the radio access point has a data frame needing to be sent to the wireless terminal, the terminal obtains cached data by sending PS-Poll. However, a Listen Interval field of the terminal uses two bytes to indicate a quantity of beacon interval units, and Beacon Interval uses two bytes to indicate a quantity of TUs. Therefore, a maximum listen interval can be up to only over one hour. However, some devices with relatively small amounts of data, for example, sensor devices, may have no data for hours or even days, and need to wake up at intervals to listen to a beacon, wasting device power. IEEE 802.11ah proposes use of a TWT (Target Wake Time, target wake time, TWT for short) to negotiate a longer time. However, when the radio access point has data needing to be sent to the terminal, the radio access point needs to cache the data for a relatively long time until the terminal wakes up. On the one hand, this increases cache load of the radio access point. On the other hand, this causes downlink data of the radio access point to take a relatively long time to arrive at the terminal, and particularly some relatively urgent data cannot be transmitted to the terminal in time.

SUMMARY

A technical problem to be resolved in embodiments of the present invention is to provide a station wake-up method, a related device, and a system, to resolve problems of high power consumption and a long data transmission delay of a terminal in the prior art.

According to a first aspect, in a possible implementation of this application, a station wake-up method is provided. The station wake-up method includes: sending, by a radio access point, a work extension indication message to wake-up modules of n stations in an awake state in associated stations, where a station includes a wake-up module and a communications module, and the n stations are in the awake state. In this way, the n stations can receive the work extension indication message sent by the radio access point, and the n stations that receive the work extension indication message add a new awake window after a current awake window, thereby increasing duration in which the n stations is awake, so that a chance that the n stations receive a wake-up message is increased. The radio access point sends a wake-up message to a wake-up module of at least one of the n stations. Only a station in the awake state can receive the wake-up message, to be specific, the station can receive the wake-up message only when the wake-up message is sent in an awake window of the station. A wake-up module of the station that receives the wake-up message sends the wake-up message to the communications module. After the communications module is woken up, the station can normally communicate with the radio access point.

In the foregoing embodiment, the radio access point sends the work extension indication message to the one or more stations in the awake state, to instruct the stations to add the new awake window after the current awake window, increasing a chance that a station is woken up.

With reference to the first aspect, in a first possible implementation, before the sending, by a radio access point, a work extension indication message to wake-up modules of n stations in associated stations, the method further includes:

obtaining, by the radio access point, duration of awake windows and sleep windows of the wake-up modules of the n stations. Duty cycle configuration information may be configured for the n stations in advance. The duty cycle configuration information indicates awake window duration, an awake window repetition period, an awake window start moment, an awake window end moment, sleep window duration, a sleep window repetition period, a sleep window start moment, and a sleep window end moment.

With reference to the first possible implementation of the first aspect, in a second possible implementation, the sending, by a radio access point, a work extension indication message to wake-up modules of n stations in associated stations includes:

sending, by the radio access point, the work extension indication message at a first sending moment, where the awake windows of the n stations overlap, and the first sending moment is in an awake window overlapping time period of the n stations.

With reference to the first aspect, in a third possible implementation, before the sending, by a radio access point, a work extension indication message to wake-up modules of n stations in associated stations, the method further includes:

setting, by the radio access point, duration of awake windows and sleep windows of the associated stations; and grouping, by the radio access point, aligned stations having equal awake window duration in the associated stations to a same group, where awake windows of two stations in different groups do not overlap.

With reference to the third possible implementation of the first aspect, in a fourth possible implementation, the sending, by a radio access point, a work extension indication message to wake-up modules of n stations in associated stations includes: sending, by the radio access point, the work extension indication message at a second sending moment, where awake windows of the n stations are equal in duration and aligned with each other, and the second sending moment is in an awake window overlapping time period of the n stations.

With reference to the first aspect, in a fifth possible implementation, before the sending, by a radio access point, a work extension indication message to wake-up modules of n stations in associated stations, the method further includes: setting, by the radio access point, awake windows of the associated stations to be equal in duration and aligned with each other, dividing the associated stations into a plurality of groups, and allocating a same group number to stations in a same group. In the foregoing embodiment, the radio access point may select one or more groups by using group numbers, and send a work extension indication message or a wake-up message to the selected one or more groups, so that a message receiving range can be accurately controlled.

With reference to the fifth possible implementation of the first aspect, in a sixth possible implementation, the sending, by a radio access point, a work extension indication message to wake-up modules of n stations in associated stations includes: sending, by the radio access point, the work extension indication message at a third moment, where the work extension indication message carries a group number of the n stations, the n stations belong to a same group, and the third sending moment is in an awake window overlapping time period of the n stations.

With reference to the first aspect, in a seventh possible implementation, the work extension indication message further carries extension time indication information, and a station may increase duration of the new awake window based on the extension indication information. In the foregoing embodiment, an extension time of the new awake window can be controlled.

With reference to the seventh possible implementation of the first aspect, in an eighth possible implementation, new awake windows respectively corresponding to the n stations are not adjacent to the current awake window. Being not adjacent indicates that the current awake window and the new awake windows are not consecutive.

According to a second aspect, an embodiment of the present invention provides a station wake-up method, including:

receiving, by a wake-up module of a station, in a current awake window, a work extension indication message sent by a radio access point, where the station includes the wake-up module and a communications module; adding, by the station, a new awake window after the current awake window based on the work extension indication message; and waking up, by the station, the communications module when receiving, in the current awake window and the new awake window, a wake-up message sent by the radio access point. In this way, the station can normally communicate with the communications module. In the foregoing embodiment, the station receives, in the current awake window, the work extension indication message sent by the radio access point, and adds the new awake window after the current awake window, to increase duration of maintaining awake, and increase a chance that the station receives the wake-up message.

With reference to the second aspect, in a first possible implementation, before the receiving, by a wake-up module of a station, in a current awake window, a work extension indication message sent by a radio access point, the method further includes: sending, by the station, duration of an awake window and a sleep window of the wake-up module to the radio access point, where the radio access point can obtain duty cycle configuration information of all associated stations; or actively configuring, by the radio access point, duty cycle configuration information of the wake-up module of the station, and configuring, by the station, duration, start moments, end moments, repetition periods, and the like of the awake window and the sleep window of the wake-up module after receiving a configuration indication sent by the radio access point.

With reference to the second aspect or the first possible implementation of the second aspect, in a second possible implementation, the adding, by the station, a new awake window after the current awake window based on the work extension indication message includes: obtaining a group number carried in the work extension indication message; and determining whether a group number of the station is the same as the carried group number, and if the group number of the station is the same as the carried group number, adding, by the station, the new awake window after the current awake window.

With reference to the second aspect or the first possible implementation of the second aspect, in a third possible implementation, the adding, by the station, a new awake window after the current awake window based on the work extension indication message includes: determining duration of the new awake window based on extension time indication information carried in the work extension indication message, and adding the new awake window after the current awake window based on the duration. Alternatively, the work extension indication message does not need to carry extension time indication information, and the station adds the new awake window after the current awake window, where duration of the new awake window is preset duration.

With reference to the second aspect or the first possible implementation of the second aspect, in a fourth possible implementation, the method further includes:

entering, by the station, a sleep state when the new awake window is received; or entering, by the station, a sleep state when waking up the communications module.

According to a third aspect, this application provides a radio access point, including:

an extension indication module, configured to send a work extension indication message to wake-up modules of n stations in associated stations, where a station includes a wake-up module and a communications module, the wake-up modules of the n stations are in an awake state, n is an integer greater than or equal to 1, and the work extension indication message is used for instructing the wake-up modules of the n stations to add a new awake window after a current awake window; and a wake-up indication module, configured to send a wake-up message to a wake-up module of at least one of then stations, where the wake-up message is used for instructing the station to wake up a corresponding communications module, and the wake-up message is sent in a current awake window or a new awake window of the at least one station.

With reference to the third aspect, in a first possible implementation, the radio access point further includes:

an obtaining module, configured to obtain duration of awake windows and sleep windows of the n stations.

With reference to the first possible implementation of the third aspect, in a second possible implementation, the extension indication module is specifically configured to:

send the work extension indication message at a first sending moment, where the awake windows of the n stations overlap, and the first sending moment is in an awake window overlapping time period of the n stations.

With reference to the third aspect, in a third possible implementation, the radio access point further includes:

a first grouping module, configured to: set duration of sleep windows of awake windows of the associated stations; and group aligned stations having equal awake window duration in the associated stations to a same group, where awake windows of two stations in different groups do not overlap.

With reference to the third possible implementation of the third aspect, in a fourth possible implementation, the extension indication module is specifically configured to:

send the work extension indication message at a second sending moment, where awake windows of the n stations are equal to and aligned with each other, and the second sending moment is in an awake window overlapping time period of the n stations.

With reference to the third aspect, in a fifth possible implementation, the radio access point further includes:

a second grouping module, configured to: set awake windows of the associated stations to be equal in duration and aligned with each other, divide the associated stations into a plurality of groups, and allocate a same group number to stations in a same group.

With reference to the fifth possible implementation of the third aspect, in a sixth possible implementation, the extension indication module is specifically configured to:

send the work extension indication message at a third sending moment, where the work extension indication message carries a group number of the n stations, and the third sending moment is in an awake window overlapping time period of the n stations.

With reference to the third aspect, in a seventh possible implementation, the work extension indication message further carries extension time indication information, where the extension time indication information is used for indicating duration of the new awake window.

With reference to the third aspect, in an eighth possible implementation, a new awake window respectively corresponding to the n stations is not adjacent to the current awake window.

According to a fourth aspect, this application provides a station, including:

a receiving module, configured to receive, by a station, in a current awake window, a work extension indication message sent by a radio access point;

an extension module, configured to add a new awake window after the current awake window based on the work extension indication message; and a triggering module, configured to wake up a corresponding communications module when a wake-up message sent by the radio access point is received in the current awake window and the new awake window.

With reference to the fourth aspect, in a first possible implementation, the station further includes:

a return module, configured to send duration of an awake window and a sleep window of the wake-up module to the radio access point; or a setting module, configured to receive a configuration indication sent by the radio access point, where the configuration indication is used for setting duration of an awake window and a sleep window of the wake-up module.

With reference to the first possible implementation of the fourth aspect, in a second possible implementation, the extension module is specifically configured to:

obtain a group number carried in the work extension indication message; and determine whether a locally stored group number is the same as the carried group number, and if yes, add the new awake window after the current awake window.

With reference to the first possible implementation of the fourth aspect, in a third possible implementation, the extension module is specifically configured to:

determine duration of the new awake window based on extension time indication information carried in the work extension indication message, and add the new awake window after the current awake window; or determine duration of the new awake window based on preset duration, and add the new awake window after the current awake window.

With reference to the first possible implementation of the fourth aspect, in a fourth possible implementation, the station further includes:

a switching module, configured to enter a sleep state when the new awake window ends; or enter a sleep state when the communications module is woken up.

According to a fifth aspect, this application provides a communications system, including a radio access point and associated stations, where a station includes a wake-up module and a communications module, and the radio access point sends a work extension indication message to wake-up modules of n stations in the associated stations that are associated, where the station includes the wake-up module and the communications module, the wake-up modules of the n stations are in an awake state, n is an integer greater than or equal to 1, and the work extension indication message is used for instructing the wake-up modules of the n stations to add a new awake window after a current awake window; and the radio access point sends a wake-up message to a wake-up module of at least one of the n stations, where the wake-up message is used for instructing the station to wake up a corresponding communications module, and the wake-up message is sent in a current awake window or a new awake window of the at least one station.

According to a sixth aspect, this application provides a radio access point, including:

one or more processors, a memory, a bus system, a transceiver, and one or more programs, where the processor, the memory, and the transceiver are connected by using the bus system; and the one or more programs are stored in the memory, the one or more programs include an instruction, and when being executed by the radio access point, the instruction enables the radio access point to perform the method according to any one of the first aspect to the eighth possible implementation of the first aspect.

According to a seventh aspect, this application provides a computer readable storage medium that stores one or more programs, where the one or more programs include an instruction, and when being executed by the radio access point, the instruction enables the radio access point to perform the method according to any one of the first aspect to the eighth possible implementation of the first aspect.

According to an eighth aspect, this application provides a station, including:

one or more processors, a memory, a bus system, a transceiver, and one or more programs, where the processor, the memory, and the transceiver are connected by using the bus system; and the one or more programs are stored in the memory, the one or more programs include an instruction, and when being executed by the station, the instruction enables the station to perform the method according to any one of the second aspect to the fourth possible implementation of the second aspect in the claims.

According to a ninth aspect, this application provides a computer readable storage medium that stores one or more programs, where the one or more programs include an instruction, and when being executed by the station, the instruction enables the station to perform the method according to any one of the second aspect to the fourth possible implementation of the second aspect in the claims.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1A:
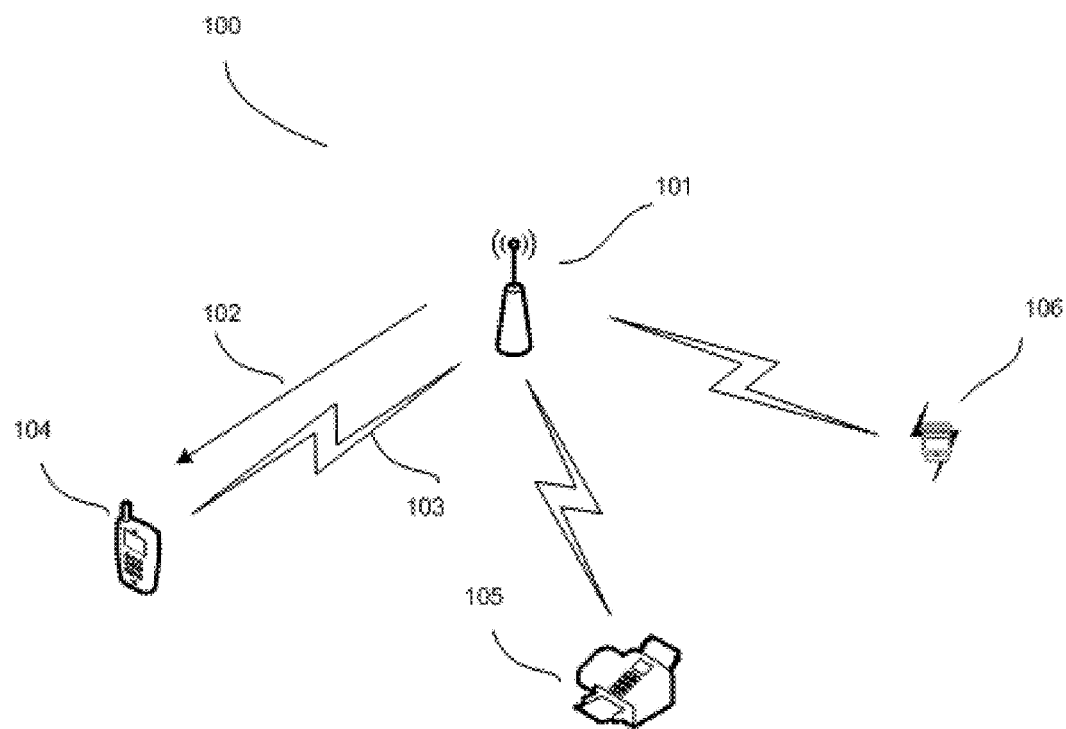
FIG. 1a is a schematic structural diagram of a wireless communications system according to an embodiment of the present invention.
Figure 1B:
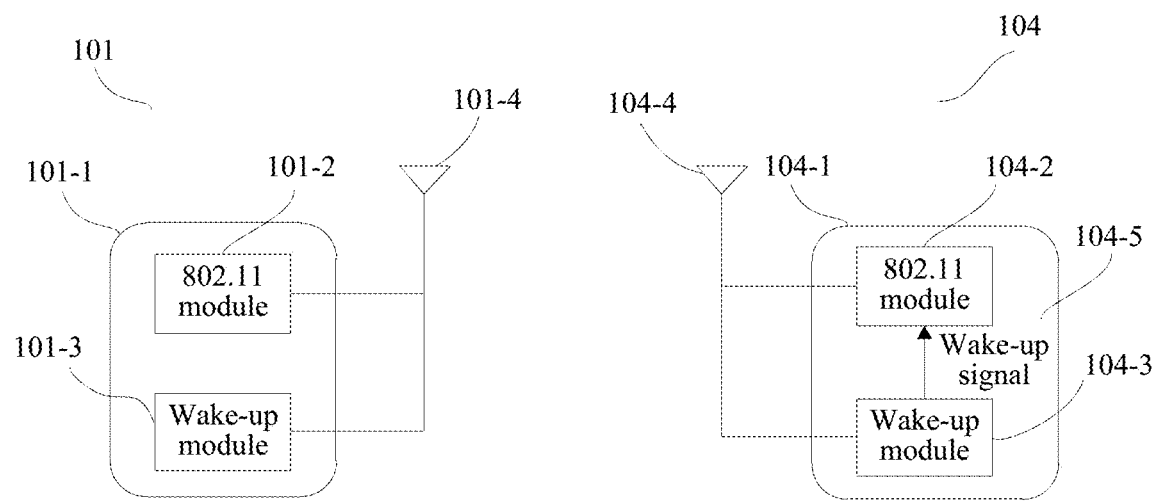
FIG. 1b is a schematic structural diagram of a station according to an embodiment of the present invention.
Figure 1C:
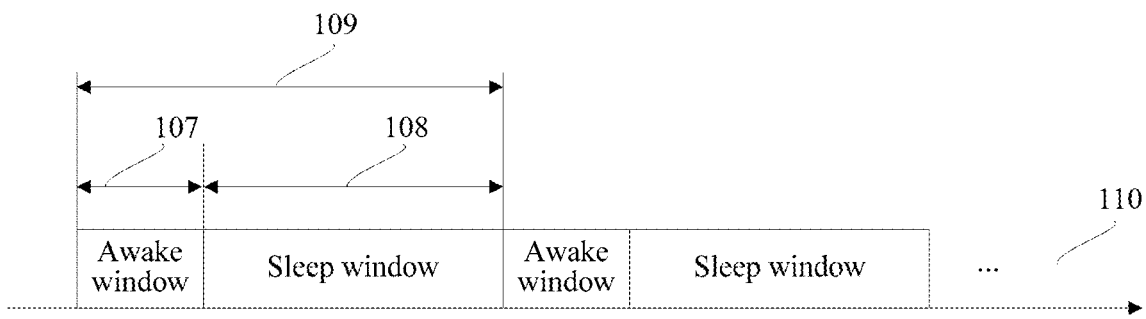
FIG. 1c is a sequence diagram of an awake window and a sleep window of a wake-up module according to an embodiment of the present invention.

Referring to FIG. 1a to FIG. 1c, FIG. 1a to FIG. 1c are schematic diagrams of a wireless communications system 100. The wireless communications system 100 may run based on a wireless standard, for example, a Wi-Fi standard, typically IEEE 802.11b/g/n/ac/ax/ah, or a Wi-Fi peer-to-peer (Wi-Fi peer-to-peer network, P2P network for short below) standard, or a Wi-Fi neighbor awareness network (Wi-Fi neighbor awareness network, NAN network for short below) standard. The wireless communications system includes a communications device 101. The communications device 101 may communicate with one or more communications devices 104 to 106. The communications device 101 may be a radio access point (Access Point, AP), and the communications devices 104 to 106 are non-AP STA devices. In a specific embodiment, the communications device 101 may be a wireless router, a radio access point, or a Wi-Fi device with a hotspot mode enabled, for example, a device such as a mobile phone or a tablet. 104 to 106 may be all devices in which a Wi-Fi module is configured, such as a mobile phone, a tablet, a home appliance, a sensor, and a wearable device. 101 may be in parallel with 104 to 106 based on the IEEE 802.11 series standards, to exchange data.

A wake-up module is configured in the devices 104 to 106. The wake-up module is specially configured to receive/send a wake-up message. The wake-up message is used for triggering a receive end to wake up a communications module (such as an 802.11 module) of a station. A wake-up module is configured in each of the device 101 and the device 104. WLAN modules 101-1 in the device 101 include an 802.11 module 101-2, a wake-up module 101-3, and an antenna module 101-4. WLAN modules 104-1 in the device 104 include an 802.11 module 104-2, a wake-up module 104-3 module, and an antenna module 104-4. The wake-up module 101-3 has a sending function, 104-3 has a receiving function, and 101-3 may send a low-power-consumption frame to 104-3 in a one-way manner through a link 102. The wake-up module may use a relatively simple modulation and demodulation mechanism, such as OOK (On-off keying, on-off keying) or FSK (Frequency-shift keying, frequency-shift keying), to achieve relatively low power consumption. In this embodiment of the present invention, to enable the WLAN modules in the device 104 to save power as much as possible, the 802.11 module 104-2 may be turned off when no data is received or sent, and the wake-up module 104-3 may be kept on or be turned on according to a particular rule. When needing to send data to the device 104, the device 101 first sends a low-power-consumption wake-up message (wake-up packet) to the device 104 through the link 102 by using the wake-up module 101-3. After receiving the wake-up message, the wake-up module 104-3 of the device 104 internally generates a wake-up signal to enable the device 101 to wake up the module 104-2. Subsequently, the device 101 and the device 104 exchange Wi-Fi messages and transmit data through a link 103 by using 101-2 and 104-2.

Figure 2A:
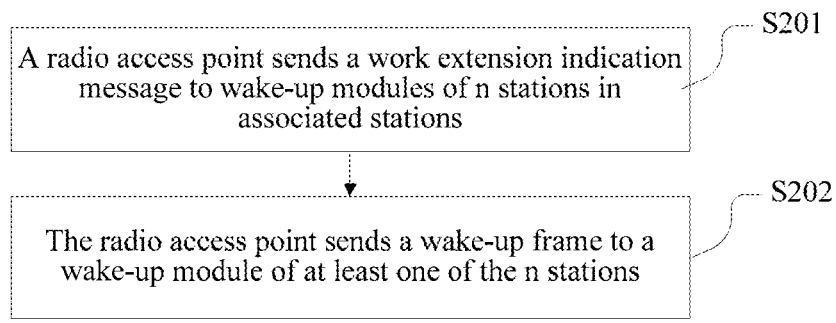
FIG. 2a is a schematic flowchart of a station wake-up method according to an embodiment of the present invention.
Figure 2B:
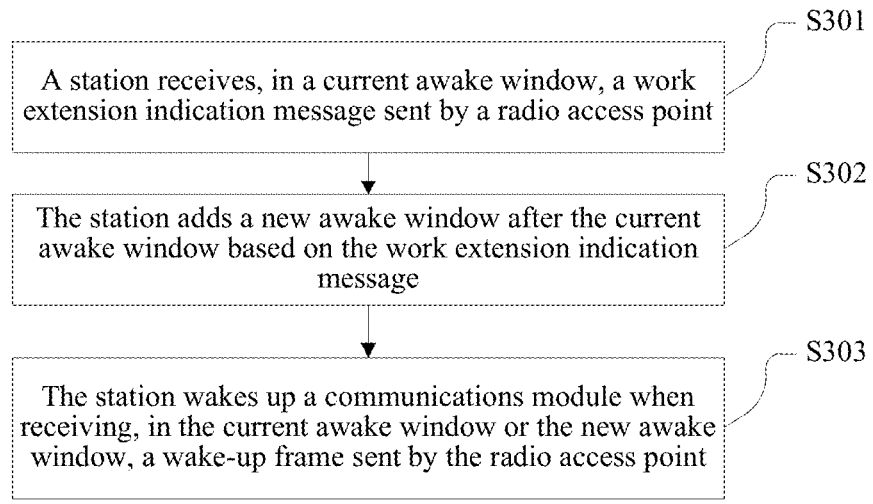
FIG. 2b is another schematic flowchart of a station wake-up method according to an embodiment of the present invention.
Figure 3:
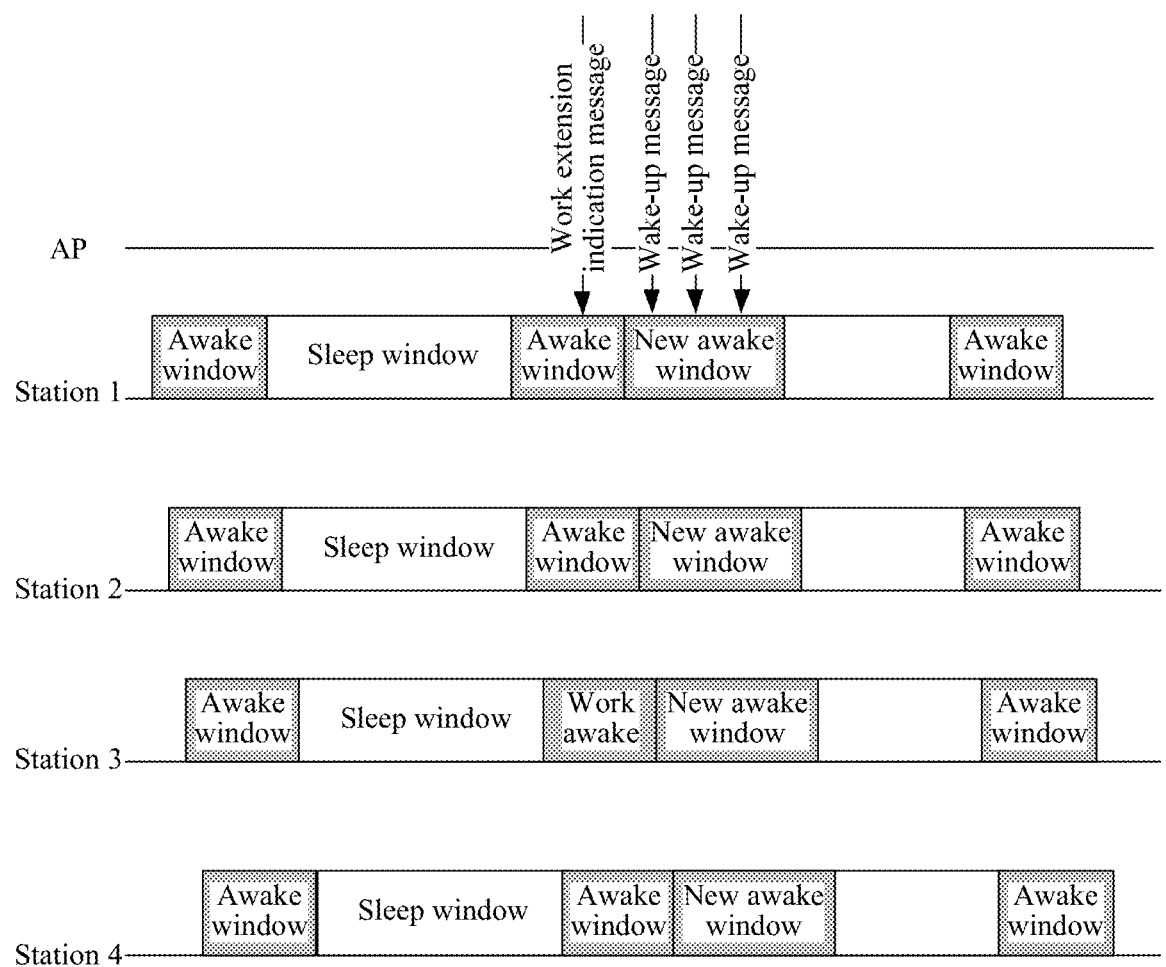
FIG. 3 is a schematic sequence diagram of a station wake-up method according to a first embodiment of the present invention.

To further reduce power consumption of the WLAN modules in the device 104, it is considered to enable the wake-up module 104-3 to work for a relatively short time as much as possible, for example, to enable 104-3 to work in a duty cycle duty cycle, as shown in FIG. 2-3. Total unit duration 109 includes an awake window 107 and a sleep window 108. Within the total duration 109, 104-3 is in an awake state in the awake window 107, that is, may normally work, and is in a sleep state in the sleep window, for example, has a receiving function disabled and only a timer turned on. In this case, duty cycle value=duration of the awake window 109/total unit duration. Electricity consumption with low power consumption may be controlled by adjusting the duty cycle. For example, within a period of time, the WLAN modules consume less electricity when a relatively small duty cycle is used, because a work time of a wake-up module thereof is shorter; and consume more electricity when a relatively large duty cycle is used. For the convenience of expression, the duty cycle subsequently described includes one or more pieces of information such as duration of a total unit time and a start/an end, awake window duration and a start time/an end time, a sleep window time and a start time/an end time, and a duty cycle value. In a time axis 110, an awake window and a sleep window of the wake-up module of 104 may be made periodically repetitive, that is, the wake-up module periodically works and sleeps. 109 shown in the figure may be continuously distributed.

Referring to FIG. 2a, FIG. 2a is a schematic flowchart of a station wake-up method according to an embodiment of the present invention. In this embodiment of the present invention, the method includes the following steps.

S201: A radio access point sends a work extension indication message to wake-up modules of n stations in associated stations.

Specifically, a communications module and a low-power-consumption wake-up module are disposed in a station. The wake-up module may wake up the communications module, so that the communications module can switch from a sleep state to an awake state. The awake state indicates that the station can normally communicate with the radio access point. The associated stations are all stations associated with the radio access point or some stations thereof. When the wake-up module of the station is currently in an awake window, the wake-up module remains in the awake state, and can communicate with the radio access point, for example, may receive a wake-up message sent by the radio access point. On the contrary, if the wake-up module of the station is currently in a sleep window, the wake-up module remains in the sleep state, and in this case, cannot communicate with the radio access point, for example, cannot receive a wake-up message sent by the radio access point. The radio access point may learn of configuration information of an awake window and a sleep window of a wake-up module of an associated station, for example, parameters such as awake window duration and sleep window duration, start moments and end moments of the awake window and the sleep window, and a repetition period. Alternatively, the radio access point configures, for associated stations of the radio access point, an awake window and a sleep window of a wake-up module corresponding to each station. Therefore, the radio access point can know wake-up modules that are of associated stations and that are in the awake state and wake-up modules that are of the associated stations and that are in the sleep state at a current moment. It is assumed that, a quantity of associated stations is m, the radio access point selects, from the associated stations, n stations whose wake-up modules are in the awake state, m and n are integers greater than or equal to 1, and m≥n. For example, when the radio access point is associated with only one station, m=1, and n=1; or when the radio access point is associated with 10 stations, but only two of the stations are selected, m=10, and n=2.

In an application scenario in this embodiment of the present invention, the radio access point and the station may be Wi-Fi devices, P2P devices, D2D devices, and NAN devices.

The radio access point sends a work extension indication message to wake-up modules that are respectively included in the n stations. A sending manner may be broadcast, multicast, or unicast. A station whose wake-up module is in the awake state can receive the work extension indication message. If the sending is performed in a broadcast manner, the work extension indication message does not need to carry station identifier information (such as a MAC address, an IP address, or another network address), and each station that receives the work extension indication message adds a new awake window after a current awake window. If the sending is performed in a multicast manner, the work extension indication message carries a group ID for which an extension operation needs to be performed, and a wake-up module of a station receives the work extension indication message, determines whether a group ID of the wake-up module is the same as the group ID carried in the work extension indication message, and if yes, performs the extension operation; otherwise, does not perform the extension operation. The multicast manner may be further implemented by using a bitmap or by carrying identifier information of a plurality of stations. This is not limited in the present invention. If the sending is performed in a unicast manner, the work extension indication message carries identifier information of one station for which an extension operation needs to be performed, and the station receives the work extension indication message, determines whether the identifier information of the station is in the one piece of identifier information carried in the work extension indication message, and if yes, performs the extension operation; otherwise, does not perform the extension operation.

It should be noted that, the start moment of the new awake window may be the same as the end moment of the current awake window, that is, the current awake window and the new awake window are continuously distributed, where the continuous distribution indicates that the current awake window is adjacent to the new awake window, or certainly may be different. For wake-up modules of a plurality of stations, duration of new awake windows corresponding to the wake-up modules of all the stations may be equal, or may be not equal; and the new windows may be aligned with each other, or may be not aligned with each other. This is not limited in the present invention. Current awake windows respectively corresponding to the n stations overlap, or certainly may be completely aligned.

S202: The radio access point sends a wake-up message to a wake-up module of at least one of the n stations, where the wake-up message is used for waking up a communications module, and the wake-up message is sent in a current awake window or a new awake window of the at least one station.

Specifically, the radio access point sends a wake-up message to wake-up modules respectively corresponding to the n stations. Because the n wake-up modules are all in the awake state, for a station, a wake-up module included in the station instructs a corresponding communications module to switch the corresponding communications module from the sleep state to the awake state; or a wake-up module instructs another module of the station to switch a communications module from the sleep state to the awake state; or when a communications module is in a power-off state, a wake-up module instructs another module of the station to power on the communications module, so that the communications module returns to the awake state. Subsequently, the station may perform high-speed data transmission with the radio access point by using the communications module. For example, when the communications module is an 802.11 module, the station may perform Wi-Fi data transmission with the radio access point.

It should be noted that, an extension operation for an awake window is performed only after the station receives a work extension indication, the current awake window is temporarily extended, and the added new awake window is located between the current awake window and a next awake window.

It can be learned from the foregoing embodiment that, when needing to communicate with the station, the radio access point instructs the station to extend the current awake window when a wake-up status is the awake state. In this way, a probability that the station is woken up can be increased, a data transmission delay can be reduced, and an awake window repetition period does not need to be reduced, thereby reducing power consumption of the station.

Referring to FIG. 2b, FIG. 2b is a schematic flowchart of a station wake-up method according to an embodiment of the present invention. In this embodiment of the present invention, the method includes the following steps.

S301: A wake-up module of a station receives, in a current awake window, a work extension indication message sent by a radio access point.

Specifically, the station includes the wake-up module and a communications module. The communications module may be a communications module that supports the 802.11 protocol. An awake window and a sleep window periodically appear. When the awake window of the station is started, the wake-up module is in an awake state. In this case, the station may communicate with the radio access point by using the wake-up module, for example, may receive a wake-up message sent by the radio access point. If the sleep window is started, the wake-up module is in a sleep state, and cannot interact with the radio access point. The station receives, in the current awake window, the work extension indication message sent by the radio access point.

S302: The station adds a new awake window after the current awake window based on the work extension indication message.

Specifically, the station may add the new awake window at a location adjacent to the current awake window, in other words, an end moment of the current awake window is equal to a start moment of the new awake window, or at a location not adjacent to the current awake window. When configuring duration of the new new window, the station may perform the configuration based on a preset default value, or may configure the duration of the new awake window based on duration indication information carried in the work extension indication message. This is not limited in the present invention.

S303: The station wakes up the communications module when receiving, in the current awake window or the new awake window, a wake-up message sent by the radio access point.

Specifically, after adding the new awake window, if the station receives, in the current awake window or the new awake window, the wake-up message sent by the radio access point, a wake-up module of the station sends a wake-up indication message to the corresponding communications module, to instruct the communications module to switch from the sleep state to the awake state. Therefore, in this case, the station may normally perform data transmission with the radio access point by using the communications module, for example, may receive the wake-up message sent by the radio access point. When the wake-up module of the station successfully wakes up the communications module, the wake-up module may immediately switch to the sleep state; or the wake-up module switches to the sleep state when the new awake window ends. The sleep state of the wake-up module may be switched to the awake state when a next awake window arrives, or be switched to the awake state after the communications module switches from the awake state to the sleep state.

Before the receiving, by a wake-up module of a station, in a current awake window, a work extension indication message sent by a radio access point, the method further includes:

sending, by the station, duration of an awake window and a sleep window of the wake-up module to the radio access point; or receiving, by the station, a configuration indication sent by the radio access point, where the configuration indication is used for setting duration of an awake window and a sleep window of the wake-up module.

Specifically, the configuration information of the awake window and the sleep window of the wake-up module of the station may be preset in the factory, and the radio access point obtains the configuration information of the awake window and the sleep window of the wake-up module during an association process or after a successful association; or the radio access point configures the configuration information of the awake window and the sleep window of the wake-up module of the station during an association process or after a success association.

Optionally, the adding a new awake window after the current awake window based on the extension indication message includes:

obtaining a group number carried in the work extension indication message; and determining whether a locally stored group number is the same as the carried group number, and if yes, adding the new awake window after the current awake window.

Specifically, the radio access point groups stations in advance, and a same group number is allocated to stations in a same group. In this way, the radio access point adds, to the extension indication message, a group number of a group for which an extension operation needs to be performed, to implement a multicast function.

Optionally, the adding a new awake window after the current awake window based on the extension indication message includes:

determining duration of the new awake window based on extension time indication information carried in the work extension indication message, and adding the new awake window after the current awake window; or determining duration of the new awake window based on preset duration, and adding the new awake window after the current awake window.

Optionally, the method further includes:

entering, by the wake-up module of the station, the sleep state when the new awake window ends; or entering, by the wake-up module of the station, the sleep state when waking up the communications module, and switching to the awake state based on an indication of the communications module when the new awake window ends.

Referring to FIG. 3, FIG. 3 is a sequence diagram of a station wake-up method according to an embodiment of the present invention. The following describes a station wake-up method according to an embodiment of the present invention with reference to the sequence diagram in FIG. 3. A radio access point is associated with associated stations. The radio access point obtains duty cycle duty cycle configuration information of the associated stations. The duty cycle configuration information may include information such as awake window duration and sleep window duration, start moments and end moments of an awake window and a sleep window, and a repetition period. The awake window duration and sleep window duration of the stations may not be equal, awake windows of one or more stations overlap in a time axis. In FIG. 3, descriptions are provided, where n=4, the stations have equal awake window duration and equal sleep window duration, and the awake windows of the stations overlap: When the radio access point needs to transmit data to stations corresponding to a station 1, a station 2, and a station 3, the radio access point determines that the station 1, the station 2, the station 3, and a station 4 are in an awake state at a current moment, and sends a work extension indication message in a current awake window overlapping time period of the station 1, the station 2, the station 3, and the station 4. In this way, the station 1, the station 2, the station 3, and the station 4 can all receive the work extension indication message. The stations that receive the work extension indication message add new awake windows after current awake windows. The new awake windows may be connected to the current awake windows, duration of the new awake windows added by the station may be equal. The station may determine the duration of the new awake window based on duration indication information carried in the work extension indication message, or may determine the duration of the new awake window based on a default value. A description is provided by using the station 1 as an example. The station 1 receives, in the awake state, the work extension indication message sent by the radio access point, and adds the new awake window at a location after and adjacent to the current awake window. In this way, duration of the awake state of the station 1 is correspondingly increased. After sending the work extension indication message, the radio access point sends, in an awake window corresponding to a station to which a wake-up message needs to be sent, one or more wake-up messages to the station. Only a station whose wake-up module is in the awake state can receive a wake-up message. In FIG. 3, the wake-up message is sent to the station whose wake-up module is in the awake state. It is assumed that stations whose wake-up modules are in the awake state are the station 1, the station 2, the station 3, and the station 4, the station 1 to the station 4 can all receive the wake-up message, and the wake-up modules trigger corresponding communications modules to switch from a sleep state to the awake state. In this way, a station can re-establish a communication connection to the radio access point by using a communications module, and perform data transmission, for example, may receive a wake-up message sent by the radio access point.

It should be noted that, the radio access point does not necessarily send wake-up messages to all stations with extension, and may send wake-up messages to only some stations thereof. A station that receives a wake-up message may immediately wake up a communications module of the station, and a wake-up module that does not receive a wake-up message performs waking up when a time ends. When the wake-up module of the station successfully wakes up the communications module, the wake-up module may immediately switch to the sleep state; or the wake-up module switches to the sleep state when the new awake window ends. The sleep state of the wake-up module may be switched to the awake state when a next awake window arrives, or be switched to the awake state after the communications module switches from the awake state to the sleep state.

It can be learned from the foregoing implementation that, the radio access point instructs the station to extend the current awake window, so that the radio access point has sufficient time to instruct the wake-up module of the station to wake up the corresponding communications module, thereby increasing a probability that the station is woken up, and reducing a data transmission delay.

Figure 4:
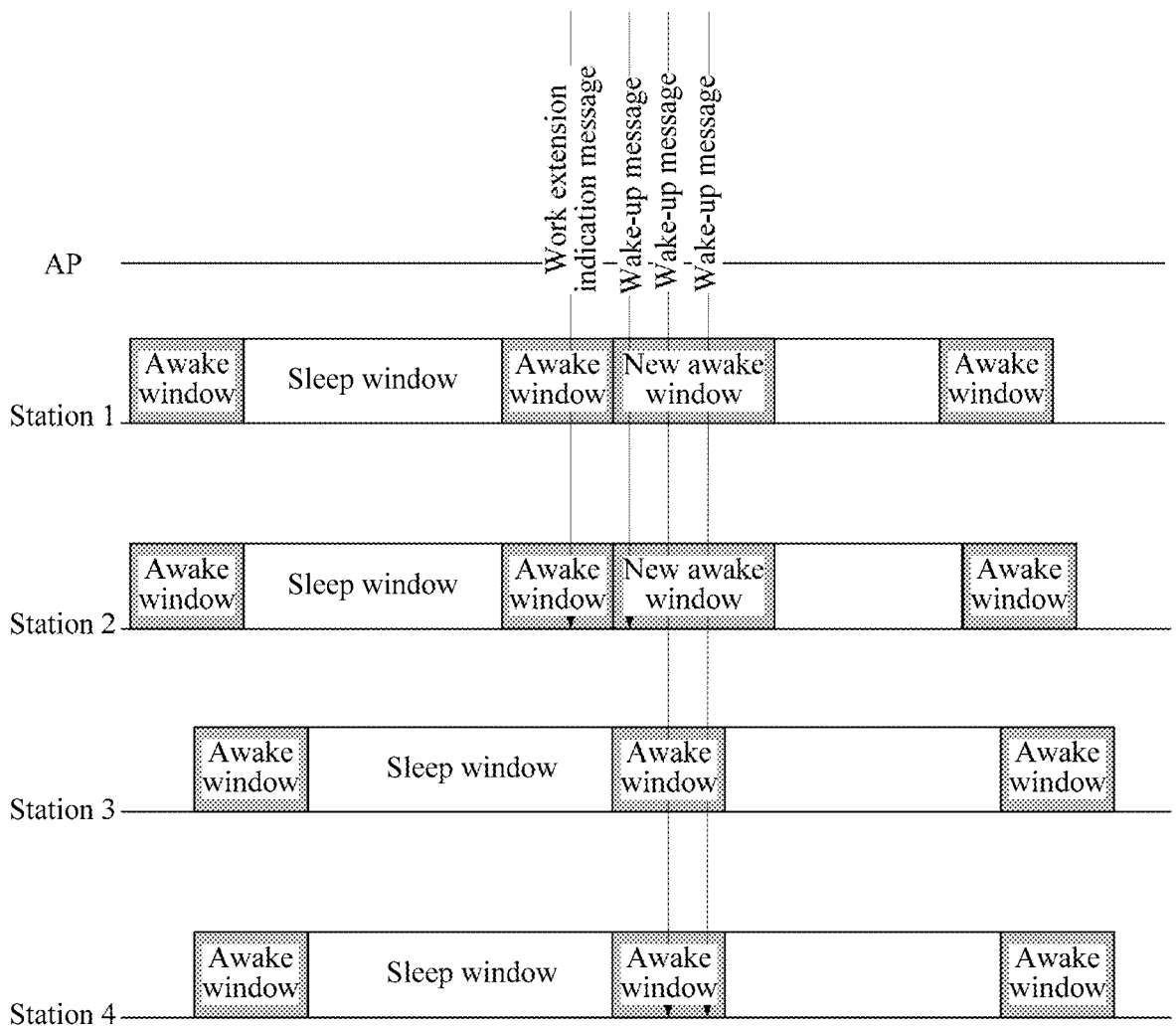
FIG. 4 is a schematic sequence diagram of a station wake-up method according to a first embodiment of the present invention.

Referring to FIG. 4, FIG. 4 is a sequence diagram of a station wake-up method according to an embodiment of the present invention. In this embodiment of the present invention, a plurality of stations associated with a radio access point are divided based on duty cycle configuration information. The duty cycle configuration information may include information such as awake window duration and sleep window duration, start moments and end moments of an awake window and a sleep window, and a repetition period. The radio access point groups stations whose duty cycle configuration information is the same to a same group. Stations in a same group have same duty cycle configuration information. Stations in different groups have different duty cycle configuration information and staggered awake windows, without any overlapping part. Duty cycle configuration information of a station may be centrally configured by the radio access point, or may be configured by default when a station leaves the factory. In FIG. 3, the station 1 and the station 2 are a group 1, and the station 3 and the station 4 constitute a group 2. Awake windows of the stations in the group 1 and awake windows of the stations in the group 2 are staggered, without any overlapping part. The radio access point sends, at a current moment, a work extension indication message to the station 1 and the station 2 in the awake state. The station 1 and the station 2 are in the awake state. The station 1 and the station 2 in the group 1 can receive the work extension indication message. Because the awake windows for the group 1 and the awake windows for the group 2 are staggered, the station 3 and the station 4 in the group 2 are in a sleep state, and cannot receive the work extension indication message. In this way, the work extension indication message may be sent in a broadcast manner. Wake-up modules in the group 1 and the station 1 and the station 2 in the awake state can receive the work extension indication message, and add new awake windows after current awake windows. Duration of the new awake windows added by the stations may be equal, and the new windows and the current time windows may be adjacent to each other and continuous. After sending the work extension indication message, the radio access point sends one or more wake-up messages. The station 1 and the station 2 in the awake state receive the wake-up messages, and the wake-up modules trigger corresponding communications modules to switch from the sleep state to the awake state. In this way, a station can re-establish a communication connection to the radio access point by using a communications module, and perform data transmission.

It should be noted that, the radio access point does not necessarily send wake-up messages to all stations with extension, and may send wake-up messages to only some stations thereof. A station that receives a wake-up message may immediately wake up a communications module of the station, and a wake-up module that does not receive a wake-up message performs waking up when a time ends. When the wake-up module of the station successfully wakes up the communications module, the wake-up module may immediately switch to the sleep state; or the wake-up module switches to the sleep state when the new awake window ends. The sleep state of the wake-up module may be switched to the awake state when a next awake window arrives, or be switched to the awake state after the communications module switches from the awake state to the sleep state.

It can be learned from the foregoing embodiment that, awake windows of stations in different groups are staggered. Therefore, a specified station can be instructed to extend awake window duration, to prevent incorrect triggering.

Figure 5:
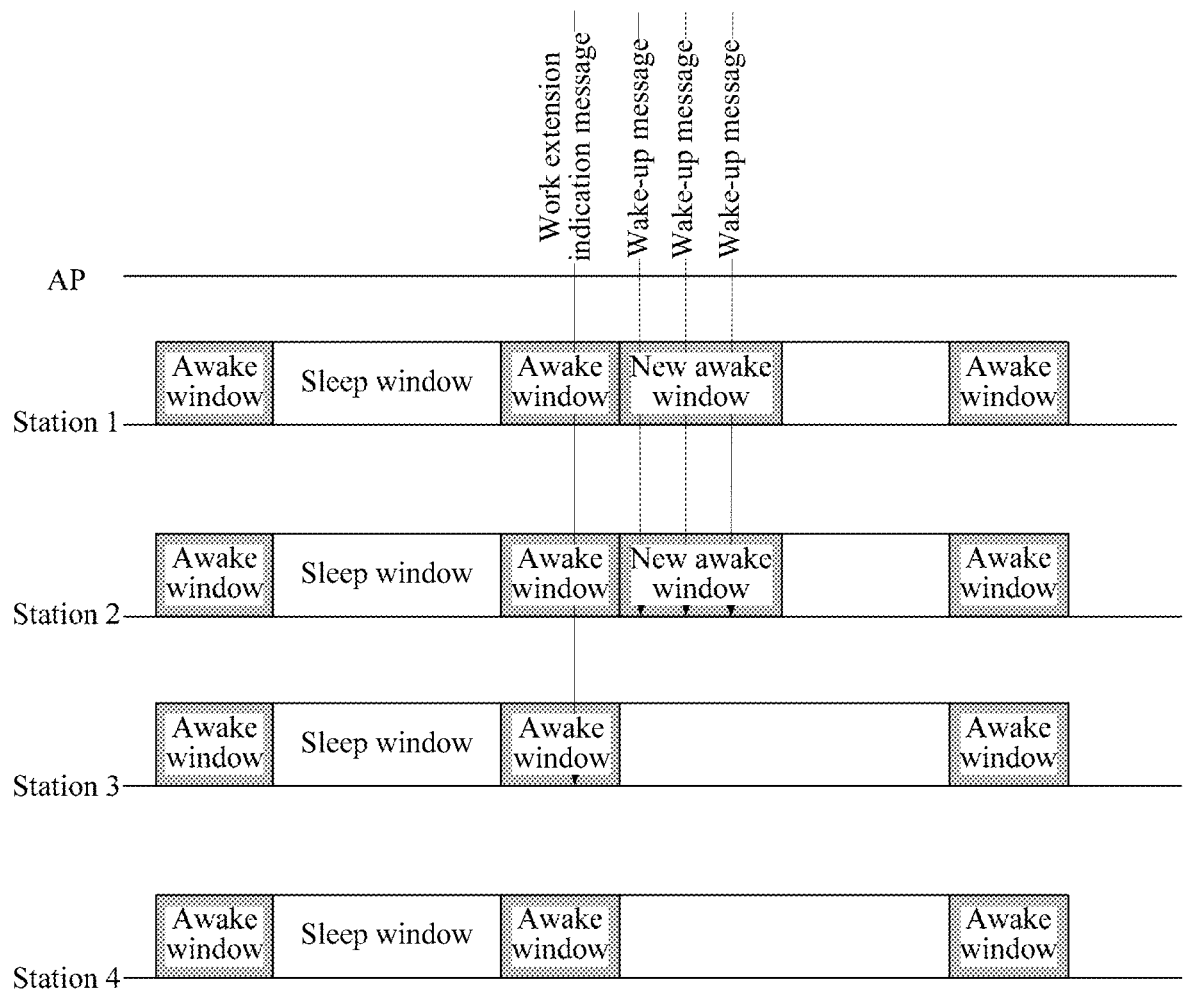
FIG. 5 is a schematic sequence diagram of a station wake-up method according to a first embodiment of the present invention.

Referring to FIG. 5, FIG. 5 is a sequence diagram of a station wake-up method according to an embodiment of the present invention. In this embodiment of the present invention, a radio access point divides a plurality of associated stations into a plurality of groups, and allocates a unique group number to stations in each group. The radio access point may set in such a manner that duty cycle configuration information of all the stations may be the same and awake windows are aligned with each other. A specific setting method may be sending a configuration indication in a process in which a station establishes an association with the radio access point. The duty cycle configuration information may include information such as awake window duration and sleep window duration, start moments and end moments of an awake window and a sleep window, and a repetition period. Awake windows and sleep windows of the stations may be aligned with each other. After receiving the configuration indication, a station sets an awake window and a sleep window of the station. As shown in FIG. 5, the radio access point groups a station 1 and a station 2 to a group 1, and groups a station 3 and a station 4 to a group 2. The radio access point sends a work extension indication message to stations 1 to 4 in an awake state, and the work extension indication message carries a group number of the group 1. The stations 1 to 4 are all in the awake state, and therefore can all receive the work extension indication message. The station 1 and the station 2 in the group 1 receive the work extension indication message, and determine that the group number (the group number of the group 1) carried in the work extension indication message is the same as a group number of the station 1 and the station 2. The station 1 and the station 2 add new awake windows after current awake windows. A method for adding the new awake windows may be: centrally adding the new awake windows based on location information and duration information that indicate the new awake windows and that are carried in the work extension indication message, or separately adding the new awake windows based on the work extension indication message; or adding the new windows based on a default pre-configuration, where both locations and duration of the new windows are pre-configured. After receiving the work extension indication message, the station 3 and the station 4 determine that the group number (the group number of the group 1) carried in the work extension indication message is different from a group number of the station 3 and the station 4 (a group number of the group 2), and do not perform a current awake window extension operation. After sending the work extension indication message, the radio access point sends one or more wake-up messages. After receiving the wake-up messages, the stations in the awake state instruct corresponding communications modules to switch from a sleep state to the awake state. In this way, a station can re-establish a communication connection to the radio access point, and perform data transmission. It should be noted that, the radio access point does not necessarily send wake-up messages to all stations with extension, and may send wake-up messages to only some stations thereof. A station that receives a wake-up message may immediately wake up a communications module of the station, and a station that does not receive a wake-up message performs waking up when a time ends. When the wake-up module of the station successfully wakes up the communications module, the wake-up module may immediately switch to the sleep state; or the wake-up module switches to the sleep state when the new awake window ends. The sleep state of the wake-up module may be switched to the awake state when a next awake window arrives, or be switched to the awake state after the communications module switches from the awake state to the sleep state.

It should be noted that, the work extension indication message may carry one or more group numbers. In this way, a current awake window extension operation can be performed on stations in a plurality of groups at the same time.

Figure 6:
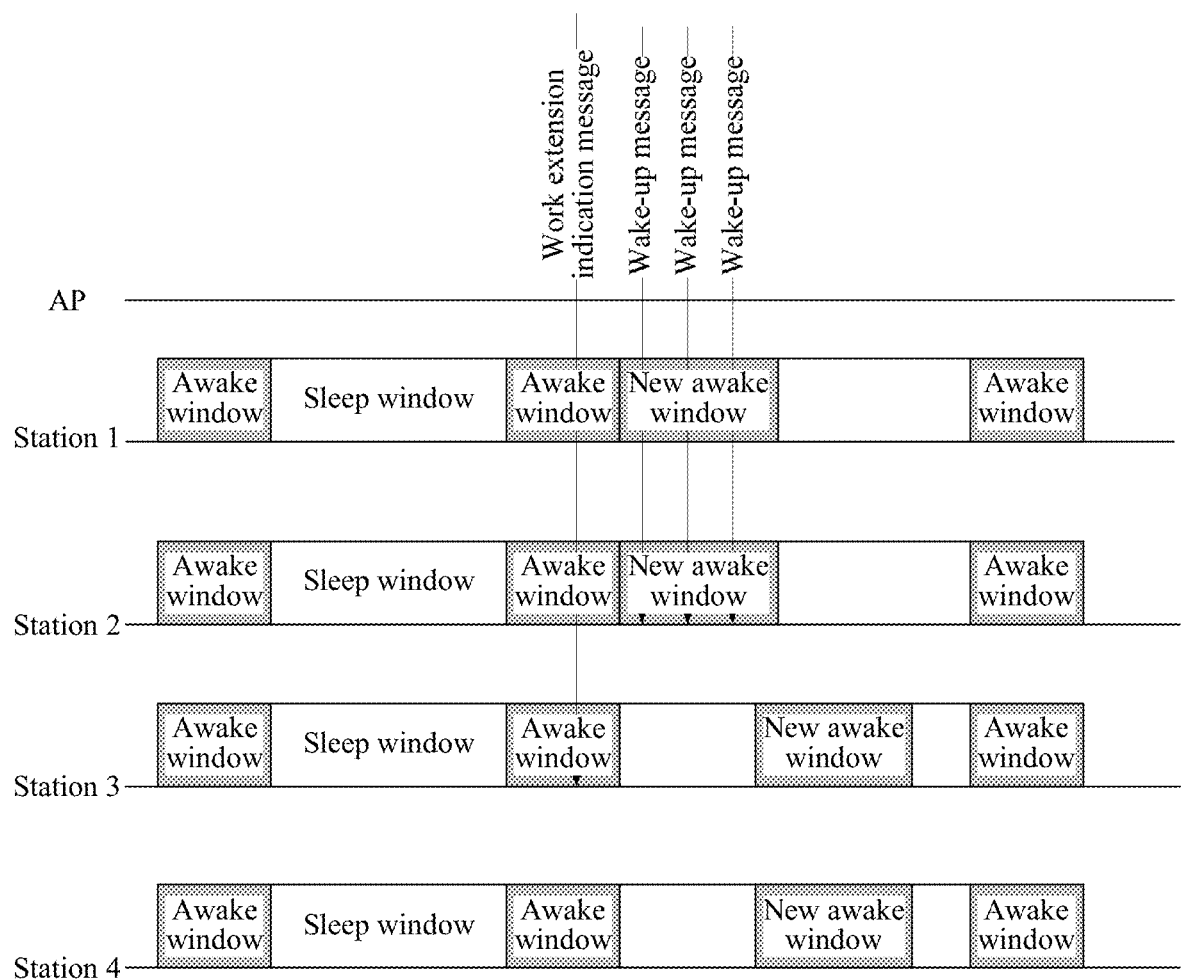
FIG. 6 is a schematic sequence diagram of a station wake-up method according to a first embodiment of the present invention.
Figure 7:
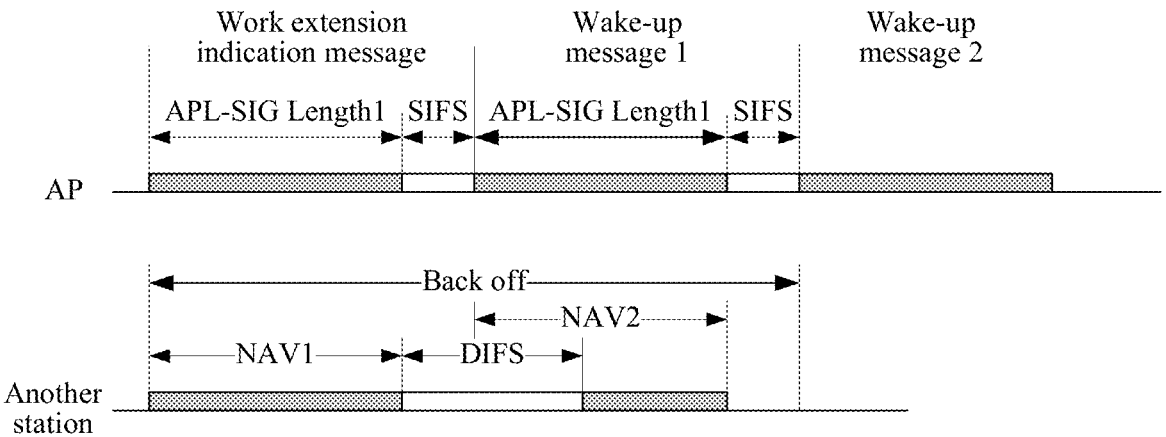
FIG. 7 is a schematic sequence diagram showing that a radio access point sends a data frame according to an embodiment of the present invention.

Referring to FIG. 6, FIG. 6 is a sequence diagram of a station wake-up method according to an embodiment of the present invention. In this embodiment of the present invention, a radio access point divides a plurality of associated stations into a plurality of groups, and allocates a unique group number to stations in each group. The radio access point may set in such a manner that duty cycle configuration information of all the stations is the same and awake windows are aligned with each other. A specific setting method may be aligning an awake window and a sleep window of a station in a process in which the station establishes an association with the radio access point. The duty cycle configuration information may include information such as awake window duration and sleep window duration, start moments and end moments of an awake window and a sleep window, and a repetition period. As shown in FIG. 5, the radio access point groups a station 1 and a station 2 to a group 1, and groups a station 3 and a station 4 to a group 2. The radio access point sends a work extension indication message, and the work extension indication message carries a group number of the group 1. The stations 1 to 4 are all in the awake state, and therefore can all receive the work extension indication message. The station 1 and the station 2 in the group 1 receive the work extension indication message, and determine that the group numbers (group numbers of the group 1 and the group 2) carried in the work extension indication message are the same as a group number (the group 1) of the station 1 and the station 2. The station 1 and the station 2 add new awake windows after current awake windows. After receiving the work extension indication message, the station 3 and the station 4 determine that the group numbers (the group numbers of the group 1 and the group 2) carried in the work extension indication message are the same as a group number of the station 3 and the station 4 (the group number of the group 2). The station 3 and the station 4 add new awake windows after current awake windows. For different groups, added new awake windows do not overlap (may be completely staggered or partially overlap). A method for adding the new awake windows may be: centrally adding the new awake windows based on location information and duration information of the new awake windows carried in the work extension indication message, or separately adding the new awake windows based on the work extension indication message; or adding the new windows based on a default pre-configuration, where both locations and duration of the new windows are pre-configured. After sending the work extension indication message, the radio access point sends one or more wake-up messages. After receiving the wake-up messages, a wake-up module in the awake state instructs a corresponding communications module to switch from a sleep state to the awake state. In this way, a station can re-establish a communication connection to the radio access point, and perform data transmission.

It should be noted that, the radio access point does not necessarily send wake-up messages to all stations with extension, and may send wake-up messages to only some stations thereof. A station that receives a wake-up message may immediately wake up a communications module of the station, and a station that does not receive a wake-up message performs waking up when a time ends. When the wake-up module of the station successfully wakes up the communications module, the wake-up module may immediately switch to the sleep state; or the wake-up module switches to the sleep state when the new awake window ends. The sleep state of the wake-up module may be switched to the awake state when a next awake window arrives, or be switched to the awake state after the communications module switches from the awake state to the sleep state.

It can be learned from the foregoing embodiment that, when the radio access point performs an awake window extension operation on stations in different groups, awake windows of the stations in the different groups are staggered. In this way, a time of an awake state of a station can be extended, a probability that the station is woken up can be increased, and a data transmission delay can be reduced.

With reference to the following tables, the following describes formats of the work extension indication message and the wake-up message provided in this embodiment of the present invention:

TABLE 1

| Pre-amble | BSS color | Broadcast indication information | Message type indication information | Extension time indication information | . . . FCS |
|---|---|---|---|---|---|

In Table 1, the preamble is used by a station to determine a valid signal. The BSS color is used for indicating a basic service set BSS to which the radio access point belongs. The broadcast indication information indicates that a message sending manner is a broadcast manner. The message type indication information indicates a message type. For example, the message type indicated by the message type indication information is the work extension indication message. The extension time indication information indicates duration of an added new awake window. The FCS is used by a receive end to verify a message.

TABLE 2

| Pre-amble | BSS color | Unicast indication information | Message type indication information | Identifier information | . . . FCS |
|---|---|---|---|---|---|

In Table 2, the unicast indication information indicates that a message manner manner is a unicast manner. The identifier information indicates an address of a receive end, for example, a MAC address or an IP address. A sending manner of the work extension indication message is a unicast manner. The identifier information of the station may be set in the factory, and reported by the receive end to the radio access point in a phase of being associated with the radio access point, or may be specified by the radio access point. When the radio access point needs to wake up a plurality of stations, a plurality of pieces of identifier information may be carried, or a group number of a group to which a plurality of stations belong may be carried.

It should be noted that, the work extension indication message and the wake-up message may be sent in a same message.

Referring to FIG. 8, FIG. 8 is a sequence diagram of sending a work extension indication message and a wake-up message according to an embodiment of the present invention. In this embodiment of the present invention, the work extension indication message and the wake-up message are different messages, and are separately sent.

Before sending a low-power-consumption frame (such as a work extension indication message or a wake-up message) to a wake-up module of a station, a radio access point needs to first send a preamble preamble of the IEEE 802.11 protocol, so that another Wi-Fi device in space backs off. Specifically, an L-LENGTH value in the preamble preamble of the IEEE 802.11 protocol may be set to be greater than or equal to a value of wake-up message transmission duration. The radio access point needs to perform channel contention on a Wi-Fi channel. If the radio access point performs Wi-Fi channel contention each time when sending a wake-up message, efficiency of the radio access point in sending the wake-up message is reduced. Therefore, in this embodiment of the present invention, when the radio access point needs to send a plurality of wake-up messages, once the radio access point successfully occupies the Wi-Fi channel for the first time, a subsequent data frame and a previous data frame at sent with a time interval of less than a DIFS time.

As shown in the figure, the radio access point needs to send one or more work extension indication messages and wake-up messages. When the radio access point obtains the Wi-Fi channel through contention for the first time and successfully sends a work extension indication message, the radio access point sets an L-LENGTH length in the preamble of the IEEE 802.11 protocol to transmission duration Length1 of the work extension indication message. Therefore, after receiving the work extension indication message, another station nearby sets NAV1=Length1 based on L-LENGTH, and avoids sending a Wi-Fi message in Length1. After completing the sending of the work extension indication message, the radio access point sends a second frame, such as a wake-up message 1, after an interval less than the DIFS time. Specifically, the radio access point may send the wake-up message 1 after an interval of the SIFS time or less than the SIFS time, and set, in an L-LENGTH part of the wake-up message 1, transmission duration Length2 of a low-power-consumption part of the wake-up message 1. Therefore, in the DIFS time after Length1 ends, another station receives the wake-up message 1 sent by the radio access point and sets NAV2 based on Length2. By using such a method, the radio access point can continuously complete transmission of a plurality of wake-up messages, and does not need to perform channel contention again, improving efficiency of the radio access point in triggering a station to be woken up.

Figure 8A:
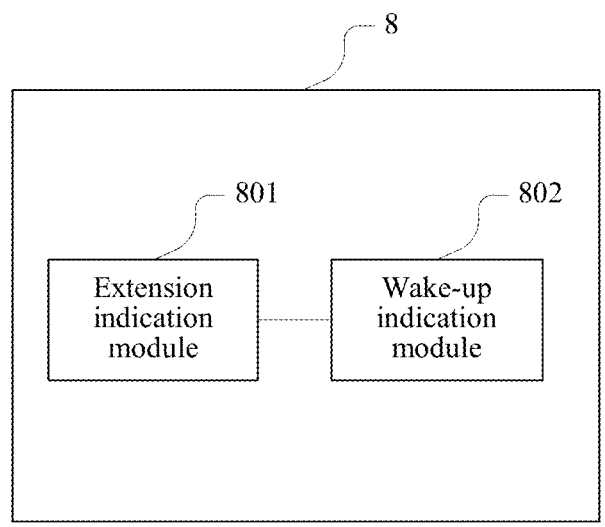
FIG. 8a is a schematic structural diagram of a radio access point according to an embodiment of the present invention.

Referring to FIG. 8a, FIG. 8a is a schematic structural diagram of a wireless access node according to an embodiment of the present invention. In this embodiment of the present invention, the wireless access node 8 includes an extension indication module 801 and a wake-up indication module 802.

The extension indication module 801 is configured to send a work extension indication message to wake-up modules of n stations in associated stations, where a station includes a wake-up module and a communications module, the wake-up modules of the n stations are in an awake state, n is an integer greater than or equal to 1, and the work extension indication message is used for instructing the wake-up modules of the n stations to add a new awake window after a current awake window.

The wake-up indication module 802 is configured to send a wake-up message to a wake-up module of at least one of the n stations, where the wake-up message is used for instructing the station to wake up a corresponding communications module, and the wake-up message is sent in a current awake window or a new awake window of the at least one station.

Optionally, a radio access point 8 further includes:
an obtaining module, configured to obtain duration of awake windows and sleep windows of the n stations.

Optionally, the extension indication module 802 is specifically configured to:
send the work extension indication message at a first sending moment, where the awake windows of the n stations overlap, and the first sending moment is in an awake window overlapping time period of the n stations.

Optionally, a radio access point 8 further includes:
a first grouping module, configured to: set duration of sleep windows of awake windows of the associated stations; and group aligned stations having equal awake window duration in the associated stations to a same group, where awake windows of two stations in different groups do not overlap.

Optionally, the extension indication module 802 is specifically configured to:
send the work extension indication message at a second sending moment, where awake windows of the n stations are equal to and aligned with each other, and the second sending moment is in an awake window overlapping time period of the n stations.

Optionally, a radio access point further includes:
a second grouping module, configured to: set awake windows of the associated stations to be equal in duration and aligned with each other, divide the associated stations into a plurality of groups, and allocate a same group number to stations in a same group.

Optionally, the extension indication module 802 is specifically configured to:
send the work extension indication message at a third sending moment, where the work extension indication message carries a group number, the n stations belong to a same group, and the sending moment is in an awake window overlapping time period of the n stations.

Optionally, the work extension indication message further carries extension time indication information, where the extension time indication information is used for indicating duration of the new awake window.

Optionally, new awake windows respectively corresponding to the n stations are not adjacent to the current awake window.

Optionally, the work extension indication message is a broadcast message, a multicast message, or a unicast message.

This embodiment of the present invention and the embodiments of FIG. 2a to FIG. 7 are based on a same idea, and technical effects brought by them are also the same. For details, refer to the descriptions of the embodiments of FIG. 2a to FIG. 7. Details are not described herein again.

Figure 8B:
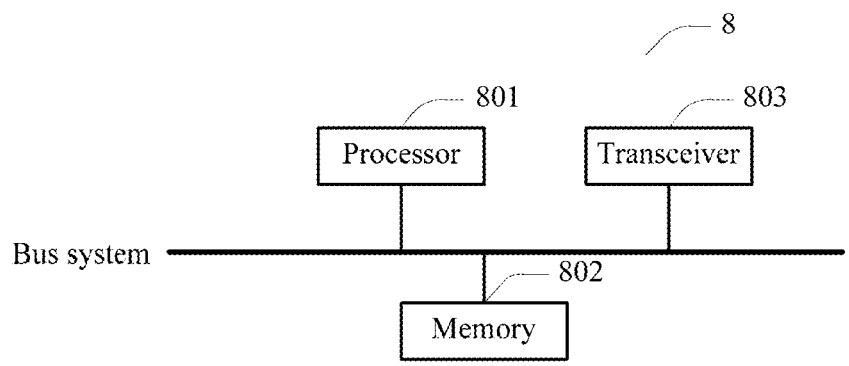
FIG. 8b is another schematic structural diagram of a radio access point according to an embodiment of the present invention.

Referring to FIG. 8b, FIG. 8b is another schematic structural diagram of a radio access point according to an embodiment of the present invention. In this embodiment of the present invention, the radio access point 8 includes a processor 801, a memory 802, and a transceiver 803. The transceiver 803 is configured to receive data from and transmit data to an external device. There may be one or more processors 801 in the radio access point 8. In some embodiments of the present invention, the processor 801, the memory 802, and the transceiver 803 may be connected by using a bus system or in another manner. The radio access point 8 may be configured to perform the method shown in FIG. 2a. For meanings of the terms and examples used in this embodiment, refer to the embodiment corresponding to FIG. 2a. Details are not described herein again.

The memory 802 stores program code. The processor 801 is configured to invoke the program code stored in the memory 802, to perform the following operations:

sending a work extension indication message to wake-up modules of n stations in associated stations, where a station includes a wake-up module and a communications module, the wake-up modules of the n stations are in an awake state, n is an integer greater than or equal to 1, and the work extension indication message is used for instructing the wake-up modules of the n stations to add a new awake window after a current awake window; and sending a wake-up message to a wake-up module of at least one of the n stations, where the wake-up message is used for instructing the station to wake up the corresponding communications module, and the wake-up message is sent in a current awake window or a new awake window of the at least one station.

Optionally, before the processor 801 performs the sending a work extension indication message to wake-up modules of n stations in associated stations, the operations further include:
obtaining duration of awake windows and sleep windows of the n stations.

Optionally, that the processor 801 performs the sending a work extension indication message to the n stations includes:
sending the work extension indication message at a first sending moment, where the awake windows of the n stations overlap, and the first sending moment is in an awake window overlapping time period of the n stations.

Optionally, before the processor 801 performs the sending a work extension indication message to wake-up modules of n stations in associated stations, the operations further include:

setting duration of sleep windows of awake windows of the associated stations; and grouping aligned stations having equal awake window duration to a same group, where awake windows of two stations in different groups do not overlap.

Optionally, that the processor 801 performs the sending a work extension indication message to wake-up modules of n stations in associated stations includes:

sending the work extension indication message at a second sending moment, where awake windows of the n stations are equal to and aligned with each other, and the second sending moment is in an awake window overlapping time period of the n stations.

Optionally, before the processor 801 performs the sending a work extension indication message to wake-up modules of n stations in associated stations, the operations further include:

setting awake windows of the associated stations to be equal in duration and aligned with each other, dividing the associated stations into a plurality of groups, and allocating a same group number to stations in a same group.

Optionally, that the processor 801 performs the sending a work extension indication message to wake-up modules of n stations in associated stations includes:

sending the work extension indication message at a third sending moment, where the work extension indication message carries a group number, the n stations belong to a same group, and the sending moment is in an awake window overlapping time period of the n stations.

Optionally, the work extension indication message further carries extension time indication information, where the extension time indication information is used for indicating duration of the new awake window.

Optionally, new awake windows respectively corresponding to the n stations are not adjacent to the current awake window.

Optionally, the work extension indication message is a broadcast message, a multicast message, or a unicast message.

Figure 9A:
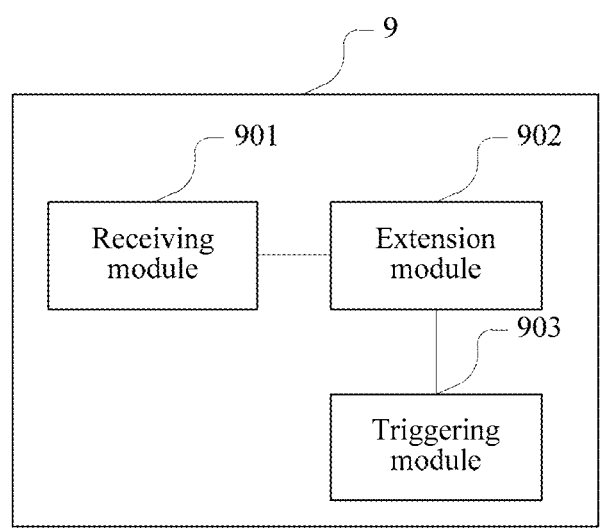
FIG. 9a is a schematic structural diagram of a wake-up module according to an embodiment of the present invention.

Referring to FIG. 9*a*, FIG. 9*a* is a schematic structural diagram of a station according to an embodiment of the present invention. In this embodiment of the present invention, the station 9 includes a receiving module 901, an extension module 902, and a triggering module 903.

The receiving module 901 is configured to receive, by a station, in a current awake window, a work extension indication message sent by a radio access point.

The extension module 902 is configured to add a new awake window after the current awake window based on the work extension indication message.

The triggering module 903 is configured to wake up a corresponding communications module when a wake-up message sent by the radio access point is received in the current awake window or the new awake window.

Optionally, the station 9 further includes:

a return module, configured to send duration of an awake window and a sleep window of the wake-up module to the radio access point; or a setting module, configured to receive a configuration indication sent by the radio access point, where the configuration indication is used for setting duration of an awake window and a sleep window of the wake-up module.

Optionally, the extension module 902 is specifically configured to:

obtain a group number carried in the work extension indication message; and determine whether a locally stored group number is the same as the carried group number, and if yes, add the new awake window after the current awake window.

Optionally, the extension module 902 is specifically configured to:

determine duration of the new awake window based on extension time indication information carried in the work extension indication message, and add the new awake window after the current awake window; or determine duration of the new awake window based on preset duration, and add the new awake window after the current awake window.

Optionally, the station further includes:

a switching module, configured to enter, by the wake-up module, a sleep state when the new awake window ends; or enter a sleep state when the station wakes up the communications module, and switch to an awake state based on an indication of the station when the new awake window ends.

This embodiment of the present invention and the embodiments of FIG. 2*a* to FIG. 7 are based on a same idea, and technical effects brought by them are also the same. For details, refer to the descriptions of the embodiments of FIG. 2*a* to FIG. 7. Details are not described herein again.

Figure 9B:
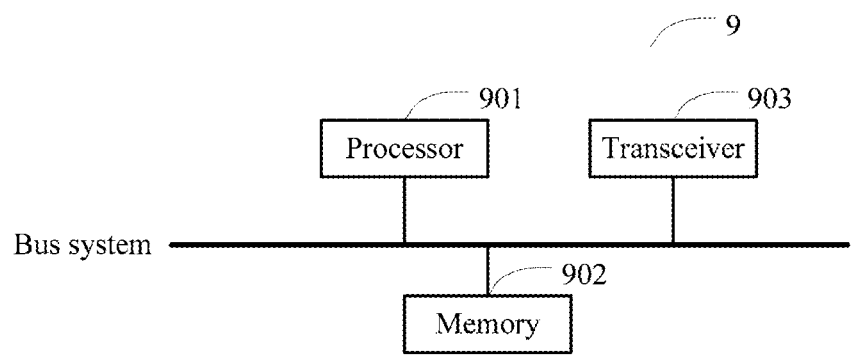
FIG. 9b is a schematic structural diagram of a wake-up module according to an embodiment of the present invention.

Referring to FIG. 9*b*, FIG. 9*b* is another schematic structural diagram of a station according to an embodiment of the present invention. In this embodiment of the present invention, the station 9 includes a processor 901, a memory 902, and a transceiver 903. The transceiver 903 is configured to receive data from and transmit data to an external device. There may be one or more processors 901 in the station 9. In some embodiments of the present invention, the processor 901, the memory 902, and the transceiver 903 may be connected by using a bus system or in another manner. The station 9 may be configured to perform the method shown in FIG. 2*b*. For meanings of the terms and examples used in this embodiment, refer to the embodiment corresponding to FIG. 2*b*. Details are not described herein again.

The memory 902 stores program code. The processor 901 is configured to invoke the program code stored in the memory 902, to perform the following operations:

receiving, by a wake-up module of the station, in a current awake window, a work extension indication message sent by a radio access point;

adding a new awake window after the current awake window based on the extension indication message; and waking up a corresponding communications module when a wake-up message sent by the radio access point is received in the current awake window and the new awake window.

Optionally, that the processor 901 performs the adding a new awake window after the current awake window based on the extension indication message includes:

obtaining a group number carried in the work extension indication message; and determining whether a locally stored group number is the same as the carried group number, and if yes, adding the new awake window after the current awake window.

Optionally, that the processor 901 performs the adding a new awake window after the current awake window based on the extension indication message includes:

determining duration of the new awake window based on extension time indication information carried in the work extension indication message, and adding the new awake window after the current awake window; or determining duration of the new awake window based on preset duration, and adding the new awake window after the current awake window.

Optionally, the processor 901 is further configured to perform:

entering a sleep state when the new awake window ends; or entering a sleep state when waking up the communications module, and switching to an awake state based on an indication of the communications module when the new awake window ends.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What are disclosed above are merely examples of embodiments of the present invention, and certainly are not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A station wake-up method, comprising:
   determining, by a radio access point, wake-up modules of n number of stations associated with the radio access point are awake, wherein a given one of the n number of stations comprises a wake-up module and a communications module and n is an integer greater than or equal to 1;
   sending, by the radio access point, a work time extension indication message to wake-up modules of n stations the work time extension indication message is for instructing the wake-up modules of the n number of stations to add a new awake window to extend a current awake window of the wake-up modules of the n stations; and
   sending, by the radio access point, a wake-up message to the wake-up module of at least one of the n number of stations, wherein the wake-up message is for instructing the station to wake up a corresponding communications module, and the wake-up message is sent in the current awake window or the new awake window of the at least one station; and, wherein before sending, by the radio access point, the work time extension indication message to wake-up modules of the n stations in associated stations, the method further comprises:
   obtaining, by the radio access point, duration of awake windows and sleep windows of the wake-up modules of the n number of stations.

2. The method according to claim 1, wherein sending, by the radio access point, the work time extension indication message to wake-up modules of the n stations in associated stations comprises:
   sending, by the radio access point, the work time extension indication message at a first sending moment, wherein the awake windows of the n number of stations overlap, and the first sending moment is in an awake window overlapping time period of the n number of stations.

3. The method according to claim 1, wherein before sending, by the radio access point, the work time extension indication message to wake-up modules of the n stations in associated stations, the method further comprises:
   setting, by the radio access point, duration of sleep windows and awake windows of stations associated with the radio access point; and
   grouping, by the radio access point, aligned stations having equal awake window duration to a same group, wherein awake windows of two stations in different groups do not overlap.

4. The method according to claim 3, wherein sending, by the radio access point, the work time extension indication message to wake-up modules of the n number of stations in stations associated with the radio access point comprises:
   sending, by the radio access point, the work time extension indication message at a second sending moment, wherein awake windows of the n number of stations are equal to and aligned with each other, and the second sending moment is in an awake window overlapping time period of then number of stations.

5. The method according to claim 1, wherein before sending, by the radio access point, the work time extension indication message to wake-up modules of the n stations in associated stations, the method further comprises:
   setting, by the radio access point, awake windows of stations associated with the radio access point to be equal in duration and aligned with each other, dividing the associated stations into a plurality of groups, and allocating a same group number to stations in a same group.

6. The method according to claim 5, wherein sending, by the radio access point, the work time extension indication message to wake-up modules of the n number of stations in associated stations comprises:
   sending, by the radio access point, the work time extension indication message at a third sending moment, wherein the work time extension indication message carries a group number of the n number of stations, and the third sending moment is in an awake window overlapping time period of the n stations.

7. The method according to claim 1, wherein the work time extension indication message further carries extension time indication information, wherein the extension time indication information is used for indicating duration of the new awake window.

8. A station wake-up method, comprising:
   receiving, by a wake-up module of a station, in a current awake window, a work time extension indication message sent by a radio access point, wherein the station comprises the wake-up module and a communications module, wherein the station is one of n number of stations associated with a radio access point, the number of stations being determined by the radio access point to have wake-up modules that are awake;
   adding, by the station, a new awake window to extend the current awake window based on the work time extension indication message; and
   waking up, by the station, the communications module when receiving, in the current awake window or the new awake window, a wake-up message sent by the radio access point; and, wherein
   before receiving, by the wake-up module of the station, in the current awake window, the work time extension indication message sent by the radio access point, the method further comprises:

sending, by the station, duration of an awake window and a sleep window of the wake-up module to the radio access point; or receiving, by the station, a configuration indication sent by the radio access point, wherein the configuration indication is used for setting duration of an awake window and a sleep window of the wake-up module.

9. The method according to claim 8, wherein the adding, by the station, a new awake window to extend the current awake window based on the work time extension indication message comprises:

obtaining a group number carried in the work time extension indication message; and determining whether a stored group number is the same as the carried group number, and if yes, adding the new awake window after the current awake window.

10. The method according to claim 8, further comprising:

entering, by the station, a sleep state when the new awake window ends; or entering, by the station, a sleep state when waking up the communications module.

11. A radio access point, comprising one or more processors, wherein the one or more processors are coupled to one or more memories storing program instructions for execution by the processors; wherein by executing the program instructions, the radio access point is enabled to perform:

determining wake-up modules of n number of stations associated with the radio access point are awake, wherein a given one of the n number of stations comprises a wake-up module and a communications module and n is an integer greater than or equal to 1;

sending a work time extension indication message to wake-up modules of n stations, wherein the work time extension indication message is for instructing the wake-up modules of the n number of stations to add a new awake window to extend a current awake window of the wake-up modules of the n stations; and sending a wake-up message to the wake-up module of at least one of the n number of stations, wherein the wake-up message is for instructing the station to wake up a corresponding communications module, and the wake-up message is sent in the current awake window or the new awake window of the at least one station; and, wherein the radio access point is enabled to further perform: before sending the work time extension indication message to the wake-up modules of the n number of stations, obtaining duration of awake windows and sleep windows of the wake-up modules of the n number of stations.

12. The radio access point according to claim 11, wherein sending the work time extension indication message to the wake-up modules of the n stations in associated stations comprises:

sending the work time extension indication message at a first sending moment, wherein the awake windows of the n stations overlap, and the first sending moment is in an awake window overlapping time period of the n stations.

13. The radio access point according to claim 11, wherein the radio access point is enabled to further perform: before sending the work time extension indication message to the wake-up modules of the n number of stations, setting duration of sleep windows and awake windows of the associated stations, and grouping aligned stations having equal awake window duration to a same group, wherein awake windows of two stations in different groups do not overlap.

14. The radio access point according to claim 13, wherein sending the work time extension indication message to the wake-up modules of the n stations in associated stations comprises:

sending the work time extension indication message at a second sending moment, wherein awake windows of the n stations are equal to and aligned with each other, and the second sending moment is in an awake window overlapping time period of the n stations.

15. The radio access point according to claim 11, wherein the radio access point is enabled to further perform: before sending the work time extension indication message to the wake-up modules of the n number of stations, setting awake windows of the associated stations to be equal in duration and aligned with each other, dividing the associated stations into a plurality of groups, and allocating a same group number to stations in a same group.

16. The radio access point according to claim 15, wherein sending the work time extension indication message to the wake-up modules of the n stations in associated stations comprises:

sending the work time extension indication message at a third sending moment, wherein the work time extension indication message carries a group number of the n number of stations, and the third sending moment is in an awake window overlapping time period of the n number of stations.

17. A station, comprising one or more processors, wherein the one or more processors are coupled to one or more memories storing program instructions for execution by the processors; wherein by executing the program instructions, the station is enabled to perform:

receiving, by a wake-up module of the station, in a current awake window, a work time extension indication message sent by a radio access point, wherein the station further comprises the wake-up module and a communications module, wherein the station is one of n number of stations associated with a radio access point, the number of stations being determined by the radio access point to have wake-up modules that are awake;

adding a new awake window to extend the current awake window based on the work time extension indication message; and waking up the communications module when receiving, in the current awake window or the new awake window, a wake-up message sent by the radio access point and, wherein before receiving, by the wake-up module of the station, in the current awake window, the work time extension indication message sent by the radio access point, the method further comprises:

sending, by the station, duration of an awake window and a sleep window of the wake-up module to the radio access point; or receiving, by the station, a configuration indication sent by the radio access point, wherein the configuration indication is used for setting duration of an awake window and a sleep window of the wake-up module.

* * * * *